(12) United States Patent  
Messer et al.

(10) Patent No.: US 12,345,918 B2  
(45) Date of Patent: Jul. 1, 2025

(54) SLAB WAVEGUIDE LAYER FOR ENHANCED NEAR-EYE-DISPLAY SURFACE RELIEF GRATING LIGHTGUIDE

(71) Applicant: Applied Materials, Inc., Santa Clara, CA (US)

(72) Inventors: Kevin Messer, Mountain View, CA (US); David Alexander Sell, Santa Clara, CA (US); Samarth Bhargava, Saratoga, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 18/750,069

(22) Filed: Jun. 21, 2024

(65) Prior Publication Data

US 2024/0337789 A1 Oct. 10, 2024

Related U.S. Application Data

(63) Continuation of application No. 18/496,574, filed on Oct. 27, 2023, now Pat. No. 12,050,344.

(Continued)

(51) Int. Cl.  
*G02B 6/122* (2006.01)  
*G02B 6/12* (2006.01)

(52) U.S. Cl.  
CPC ....... *G02B 6/1223* (2013.01); *G02B 6/12007* (2013.01); *G02B 2006/12107* (2013.01); *G02B 2207/101* (2013.01)

(58) Field of Classification Search  
None  
See application file for complete search history.

(56) References Cited

U.S. PATENT DOCUMENTS

| 2015/0063753 A1* | 3/2015 | Evans ................. H01S 5/12 438/31 |
| 2017/0108439 A1 | 4/2017 | Stievater et al. |

(Continued)

OTHER PUBLICATIONS

International Search Report/ Written Opinion issued to PCT/US2023/036087 on Feb. 20, 2024.

*Primary Examiner* — Chad H Smith  
(74) *Attorney, Agent, or Firm* — Patterson + Sheridan, LLP

(57) ABSTRACT

Embodiments of the present disclosure generally relate to augmented reality waveguide combiners. The waveguides includes a waveguide substrate, having a substrate refractive index (RI) $n_{sub}$, a slab waveguide layer disposed over the waveguide substrate, the slab waveguide layer having a slab RI $n_{swg}$ and a slab depth $d_{swg}$, the slab depth $d_{swg}$ from a lower surface to an upper surface of the slab waveguide layer, at least one grating defined by a plurality of grating structures, the grating structures are disposed in, on, or over the slab waveguide layer, and a superstrate between and over the grating structures, the superstrate having a superstrate RI $n_{superstrate}$ and an interface with the slab waveguide layer. The slab RI $n_{swg}$ is greater than the substrate RI $n_{sub}$ and the slab RI $n_{swg}$ is greater than the superstrate RI $n_{superstrate}$.

20 Claims, 6 Drawing Sheets

Related U.S. Application Data

(60) Provisional application No. 63/381,323, filed on Oct. 28, 2022.

(56) References Cited

U.S. PATENT DOCUMENTS

| | | |
|---|---|---|
| 2020/0096692 A1 | 3/2020 | Popovich et al. |
| 2021/0208406 A1 | 7/2021 | Tekolste et al. |
| 2022/0208826 A1 | 6/2022 | Yokogawa et al. |

\* cited by examiner

SLAB WAVEGUIDE LAYER FOR ENHANCED NEAR-EYE-DISPLAY SURFACE RELIEF GRATING LIGHTGUIDE

RELATED APPLICATIONS

This application is continuation application of U.S. application Ser. No. 18/496,574, filed Oct. 27, 2023 which claims benefit of and priority to U.S. Application No. 63/381,323, filed Oct. 28, 2022, which are herein incorporated in their entireties by reference for all purposes.

BACKGROUND

Field

Embodiments of the present disclosure generally relate to augmented reality waveguide combiners.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is displaying a virtual image overlaid on an ambient environment. Waveguide combiners are used to assist in overlaying images. Generated light is in-coupled into a waveguide combiner, propagated through the augmented waveguide combiner, out-coupled from the augmented waveguide combiner, and overlaid on the ambient environment. Light is coupled into and out of augmented waveguide combiners using surface relief gratings. Accordingly, what is needed in the art are waveguide combiners.

SUMMARY

In one embodiment, a waveguide is provided. The waveguide includes a waveguide substrate, having a substrate refractive index (RI) $n_{sub}$, a slab waveguide layer disposed over the waveguide substrate, the slab waveguide layer having a slab RI $n_{swg}$ and a slab depth $d_{swg}$, the slab depth $d_{swg}$ from a lower surface to an upper surface of the slab waveguide layer, at least one grating defined by a plurality of grating structures, the grating structures are disposed in, on, or over the slab waveguide layer, and a superstrate between and over the grating structures, the superstrate having a superstrate RI $n_{superstrate}$ and an interface with the slab waveguide layer. The slab RI $n_{swg}$ is greater than the substrate RI $n_{sub}$ and the slab RI $n_{swg}$ is greater than the superstrate RI $n_{superstrate}$.

In one embodiment, a waveguide is provided. The waveguide includes a waveguide substrate, having a substrate refractive index (RI) $n_{sub}$, a slab waveguide layer disposed over the waveguide substrate, the slab waveguide layer having a slab RI $n_{swg}$ and a slab depth $d_{swg}$, the slab depth $d_{swg}$ from a lower surface to an upper surface of the slab waveguide layer, at least one grating defined by a plurality of grating structures, the grating structures are disposed in, on, or over the slab waveguide layer, a superstrate between and over the grating structures, the superstrate having a superstrate RI $n_{superstrate}$ and an interface with the slab waveguide layer. The slab RI $n_{swg}$ is greater than the substrate RI $n_{sub}$ and the slab RI $n_{swg}$ is greater than the superstrate RI $n_{superstrate}$, and the slab depth $d_{swg}$ is 75 nm to 110 nm when the slab RI $n_{swg}$ at 620 nm is 2.1, 55 nm to 100 nm when the slab RI $n_{swg}$ at 620 nm is 2.2, 35 nm to 85 nm when the slab RI $n_{swg}$ at 620 nm is 2.3, 30 nm to 70 nm when the slab RI $n_{swg}$ at 620 nm is 2.4, 25 nm to 60 nm when the slab RI $n_{swg}$ at 620 nm is 2.5, and 15 nm to 50 nm when the slab RI $n_{swg}$ at 620 nm is 2.6.

In one embodiment, a waveguide is provided. The waveguide a waveguide substrate, having a substrate refractive index (RI) $n_{sub}$, a slab waveguide layer disposed over the waveguide substrate, the slab waveguide layer having a slab RI $n_{swg}$ and a slab depth $d_{swg}$, a fold grating defined by grating structures disposed in the slab waveguide layer, the slab depth $d_{swg}$ is from a lower surface to an upper surface of the slab waveguide layer between grating structures, and a superstrate between and over the grating structures, the superstrate having a superstrate RI $n_{superstrate}$ and an interface with the slab waveguide layer, wherein the slab RI $n_{swg}$ is greater than the substrate RI $n_{sub}$ and the slab RI $n_{swg}$ is greater than the superstrate RI $n_{superstrate}$.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to augmented reality waveguide combiners.

Figure 1A:
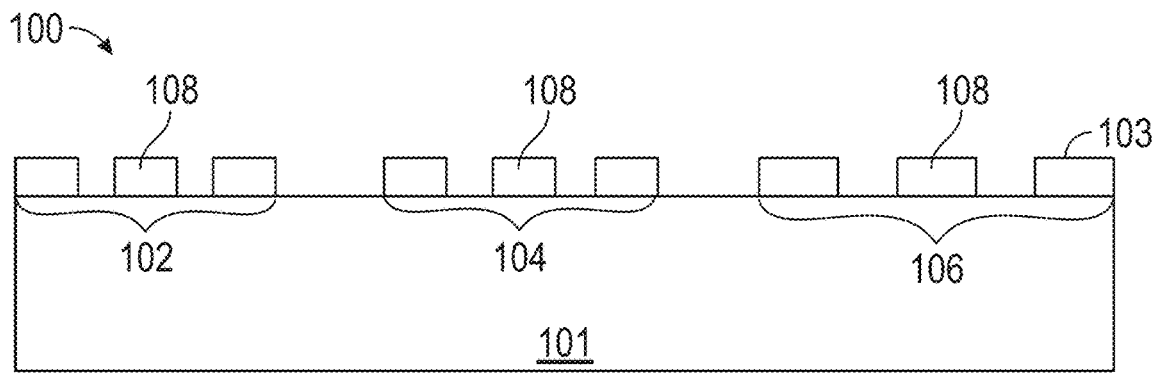
FIG. 1A is a cross-sectional view of a waveguide according to embodiments.

FIG. 1A is a cross-sectional view of a waveguide 100. The waveguide 100 includes a waveguide substrate 101. An in-coupler 102, a first grating (e.g., fold grating) 104, and a second (e.g., out-coupler) grating 106 are disposed over the waveguide substrate 101. The in-coupler 102, the first grating 104, and the second grating 106 include grating structures 108. The grating structures 108 include a device material 103 disposed over the waveguide substrate 101.

Figure 1B:
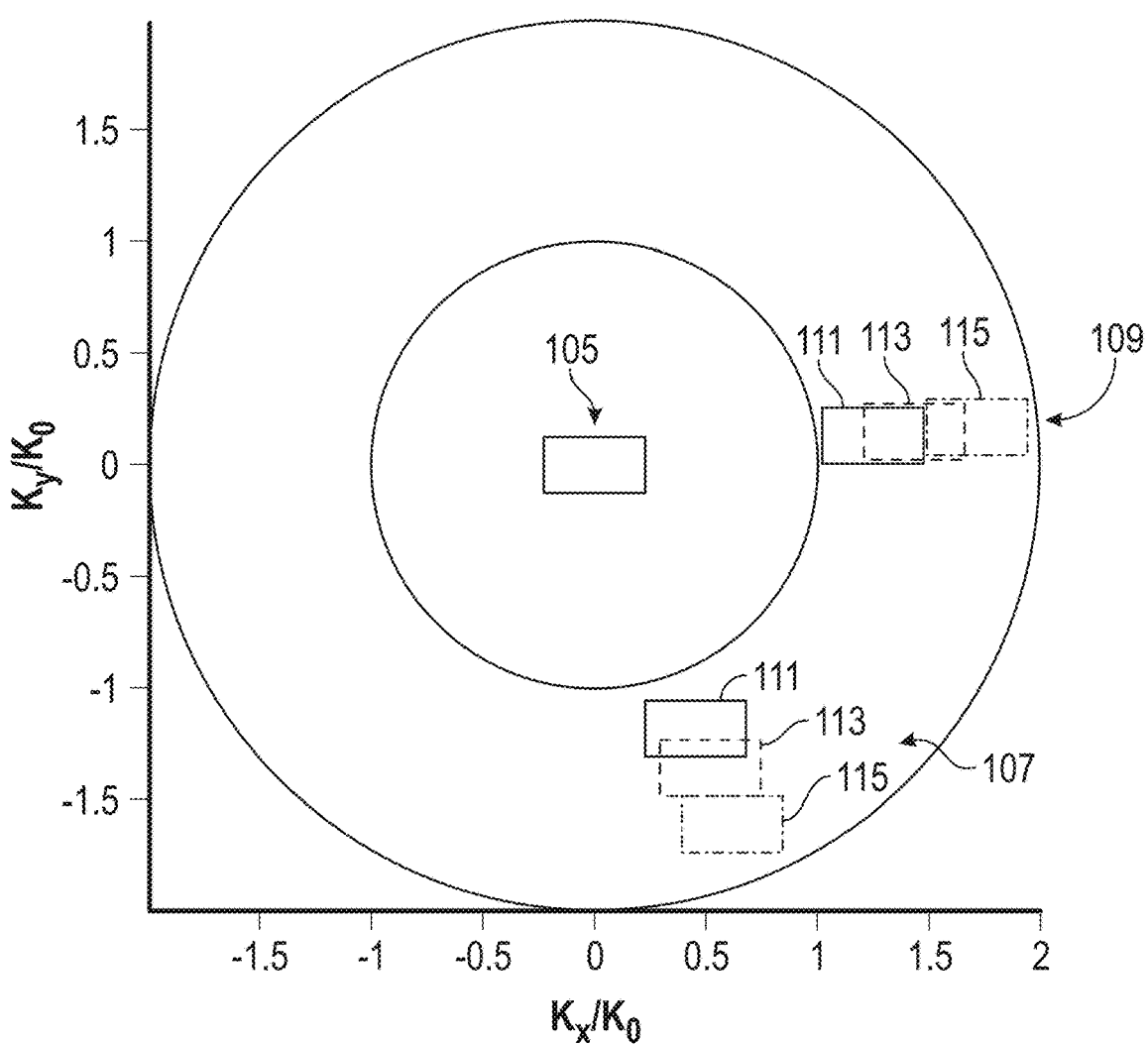
FIG. 1B is a k-space diagram of a waveguide according to embodiments.

FIG. 1B is a k-space diagram of the waveguide 100. In operation, white light is incoupled by the in-coupler 102 and undergoes total-internal-reflection (TIR) through the waveguide 100 to the fold grating. A blue channel light (wavelengths of 380 nm to about 495 nm), a green channel light (wavelength of about 495 nm to about 590 nm), a red channel light (wavelength of about 590 nm to about 750 nm) propagate under total internal reflection (TIR) at different decay rates. Beams of the light channels (blue, green, and red channel light) undergo TIR in ther fold grating until the beams of the light channels are coupled to the out-coupler 106. The beams outcoupled by the out-coupler 106 out of the waveguide 100 results in field of view of a virtual image that are projected user's eye. The fields of view include a blue field of view (FOV), a green FOV, and a red FOV.

Due to dispersion of diffracted angles of propagation inside the waveguide 100, the density of interactions with the grating surfaces is lower for longer wavelengths (red channel light) than shorter wavelengths (blue channel light). The angular dispersion due to diffraction is shown by the diffraction equation:

$$\theta_o = a\sin\left(\frac{1}{n_o}\sin(\theta_i) + /-\frac{m\lambda_0}{n_i\Lambda}\right)$$

where $\theta_o$ is the output diffracted angle, $\theta_i$ is the input angle, $\lambda_0$ is the free-space wavelength, $\Lambda$ is the grating period, $n_o$ is the output medium refractive index, $n_i$ is the input medium refractive index, and m is the diffracted order ( . . . , −2, −1, 0, +1, +2, . . . ). As wavelength increases, the diffracted angle increases.

As shown in FIG. 1B, at a first TIR state 107 and a second TIR state 109, the dispersion of propagation angles in TIR between the blue channel light, the green channel light, and the red channel light results in a blue FOV 111, a green FOV 113, and a red FOV 115 offset from each other. There is stronger out-coupling of the blue channel light in the corner of the display field-of-view nearest the projector 105, along with faster decay of blue light as the blue channel light propagates to out-coupler 106 furthest from the projector. The red channel light decays more slowly as the red light propagates, and thus dominates the image in the portion of the field-of-view furthest from the projector 105. It is desired minimize the number of substrates required in the near-eye-display, however when multiple display channels (blue, green, red channels) are intended to propagate through a waveguide substrate 101 the diffraction efficiency of the multiple display channels need to be improved.

Figure 2:
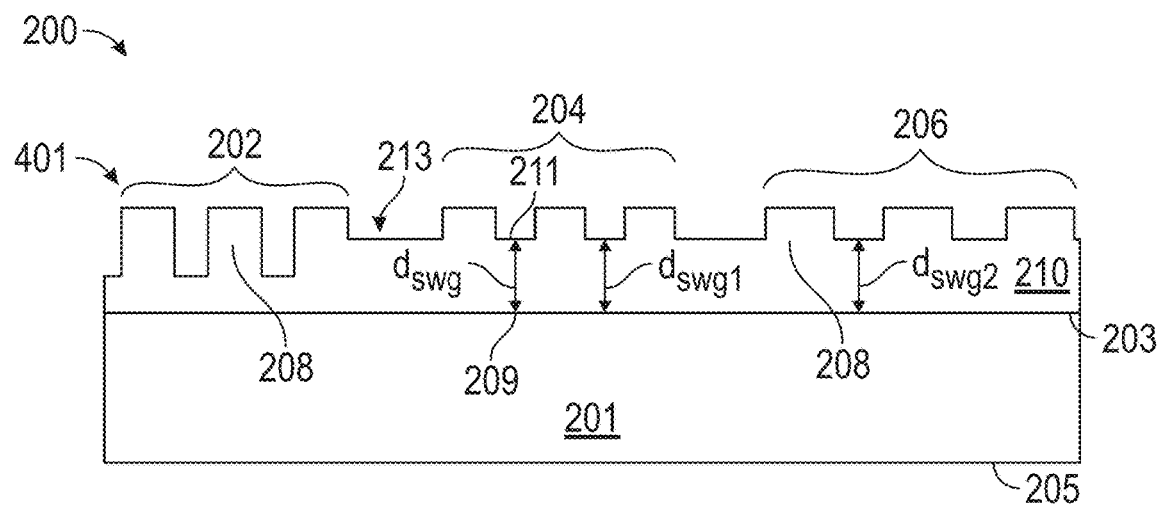
FIG. 2 is a cross-sectional view of a waveguide according to embodiments.

FIG. 2 is a cross-sectional view of a waveguide 200. The waveguide of 200 of FIG. 2 has a first configuration 401. The waveguide 200 includes a waveguide substrate 201. The waveguide substrate 201 has a substrate refractive index (RI) $n_{sub}$.

The waveguide 200 includes at least one grating defined by a plurality of grating structures 208. The waveguide 200 includes an in-coupler 202, a first grating (e.g., fold grating) 204, and a second grating (e.g., out-coupler) 206. The in-coupler 202, the first grating 204, and the second grating 206 include grating structures 208. A slab waveguide layer 210 is disposed over the waveguide substrate 201. In some embodiments, the slab waveguide layer 210 is disposed on a first surface 203 (i.e., top surface) or a second surface 205 (i.e., bottom surface) opposing the first surface 203 of the waveguide substrate 201.

In embodiments, shown in the first configuration 401, the grating structures 208, are disposed in the slab waveguide layer 210. In embodiments, shown in the third configuration 403 and the fourth configuration 404, the grating structures 208 are disposed over, and in some embodiments on, the slab waveguide layer 210. The grating structures 208 having a grating RI $n_{grat}$. A grating material 212 of the grating structures 208 resulting in the grating RI $n_{grat}$. In embodiments, of the second configuration 402, the grating structures 208 of the in-coupler 202 are disposed in the slab waveguide layer 210 and the grating structures 208 the first grating 204 and the second grating 206 are disposed over the slab waveguide layer 210.

The slab waveguide layer 210 include at least one slab depth $d_{swg}$. The first grating 204 has a first slab depth $d_{swg1}$. The second grating 204 has a second slab depth $d_{swg2}$. The slab depth $d_{swg}$ corresponds to the first slab depth $d_{swg1}$ or the second slab depth $d_{swg2}$. The slab depth $d_{swg}$ is from a lower surface 209 to an upper surface 211 of the slab waveguide layer 210. The first slab depth $d_{swg1}$ of the first configuration 401 is from the lower surface 209 to the upper surface 211 of the slab waveguide layer 210 between grating structures 208 of the first grating 204. The second slab depth $d_{swg2}$ of the first configuration 401 is from the lower surface 209 to the upper surface 211 the slab waveguide layer 210 between grating structures 208 of the second grating 206. In other embodiments, the first slab depth $d_{swg1}$ is the thickness of the slab waveguide layer 210 under the first grating 204, i.e, the distance from the lower surface 209 to the upper surface 211. The second slab depth $d_{swg2}$ is the thickness of the slab waveguide layer 210 under the second grating 206. The slab waveguide layer 210 has a slab refractive index (RI) $n_{swg}$. A superstrate 214 corresponds to region between and over the grating structures 208. In some embodiments, the superstrate 214 is air (refractive index of 1.0). In other embodiments, the superstrate 214 is a coating 504 as shown in FIG. 4C. The superstrate 214 has a superstrate RI $n_{superstrate}$. The waveguide 200 has $n_{swg}$ greater than $n_{superstrate}$, and $n_{swg}$ greater than $n_{sub}$.

The waveguide substrate 201 may be formed from any suitable material, provided that the waveguide substrate 201 can adequately transmit light in a selected wavelength or wavelength range and can serve as an adequate support for the waveguide 100 described herein. Substrate selection may include substrates of any suitable material, including, but not limited to, amorphous dielectrics, non-amorphous dielectrics, crystalline dielectrics, silicon oxide, polymers, and combinations thereof. In some embodiments, which may be combined with other embodiments described herein, the waveguide substrate 201 includes glass, silicon (Si), silicon dioxide ($SiO_2$), germanium (Ge), silicon germanium (SiGe), indium phosphide (InP), gallium arsenide (GaAs), gallium nitride (GaN), fused silica, quartz, sapphire ($Al_2O_3$), silicon carbide (SiC), lithium niobate ($LiNbO_3$), indium tin oxide (ITO), or combinations thereof. In other embodiments, which may be combined with other embodiments described herein, the waveguide substrate 201 includes high-refractive-index glass. The high-refractive-index glass includes greater than 2 percent by weight of lanthanide (Ln), titanium (Ti), tantalum (Ta), or combination thereof.

The slab waveguide layer 210 may include one or more of silicon oxycarbide (SiOC), titanium dioxide (TiO$_2$), silicon dioxide (SiO$_2$), vanadium (IV) oxide (VOx), aluminum oxide (Al$_2$O$_3$), aluminum-doped zinc oxide (AZO), indium tin oxide (ITO), tin dioxide (SnO$_2$), zinc oxide (ZnO), tantalum pentoxide (Ta$_2$O$_5$), silicon nitride (Si$_3$N$_4$), zirconium dioxide (ZrO$_2$), niobium oxide (Nb$_2$O$_5$), cadmium stannate (Cd$_2$SnO$_4$), titanium silicon oxide (TiSiOx) or silicon carbon-nitride (SiCN) containing materials. The grating material 212 may include one or more of SiOC, TiO$_2$, SiO$_2$, VOx, Al$_2$O$_3$, AZO, ITO, SnO$_2$, ZnO, Ta$_2$O$_5$, Si$_3$N$_4$, ZrO$_2$, Nb$_2$O$_5$, Cd$_2$SnO$_4$, TiSiOx, or SiCN containing materials. In some embodiments, a slab waveguide material of the slab waveguide layer 210 and the grating material 212 are the same resulting in the same $n_{grat}$ and $n_{swg}$. In other embodiments, the slab waveguide material of the slab waveguide layer 210 and the grating material 212 are different resulting in $n_{grat}$ and $n_{swg}$ that are different.

The blue, green, and red channel light will propagate in both the waveguide substrate 201 and slab waveguide layer 210 and will still experience a resonance condition as light can reflect off the superstrate and substrate interfaces. The superstrate RI $n_{superstrate}$, the slab refractive index RI $n_{swg}$, and the slab depth $d_{swg}$, such as the first slab depth $d_{swg1}$ and the second slab depth $d_{swg2}$ must be selected to reduce the ratio diffraction efficiency of the blue channel light to the red channel light.

The resonance condition of the substrate modes in the waveguide 200 will occur when the following condition is met:

$$2n_{swg}k_0\cos(\theta)d + \phi_{sub} + \phi_{grating} = 2\pi m$$

where $n_{swg}$ is the slab refractive index RI $n_{swg}$, $k_0$ is the wavenumber of light ($2\pi/\lambda_0$), d is the slab depth $d_{swg}$, $\theta$ is the angle of propagation of light in the slab waveguide layer, sub is the phase accumulated upon reflection at the slab waveguide-substrate interface 213, and $\phi_{grating}$ is the phase accumulated upon reflection at the slab waveguide-superstrate interface 213. The phases $\phi_{sub}$ and $\phi_{grating}$ can be calculated using the Fresnel equations.

The change in slab depth $d_{swg}$ between resonance peaks, $\lambda d$, is determined by solving the above resonance condition according the following formula:

$$\Delta d = \frac{\lambda_0}{2n_{swg}\cos(\theta)}$$

$\Delta d$ depends on both the wavelength ($\lambda_0$) and the angle of propagation ($\theta$). $\lambda_0$ corresponds to the wavelengths of blue channel light (wavelengths of 380 nm to about 495 nm), green channel light (wavelength of about 495 nm to about 590 nm), and red channel light (wavelength of about 590 nm to about 750 nm).

The diffraction efficiency of the waveguide 200 is modeled via optical simulation. Optical simulation includes rigorous coupled-wave analysis (RCWA), finite-difference time-domain (FDTD) method, finite element method (FEM), other methods of simulation, and combinations thereof. The optimal the slab refractive index RI $n_{swg}$ and the slab depth $d_{swg}$ are selected via modeling.

Figure 3:
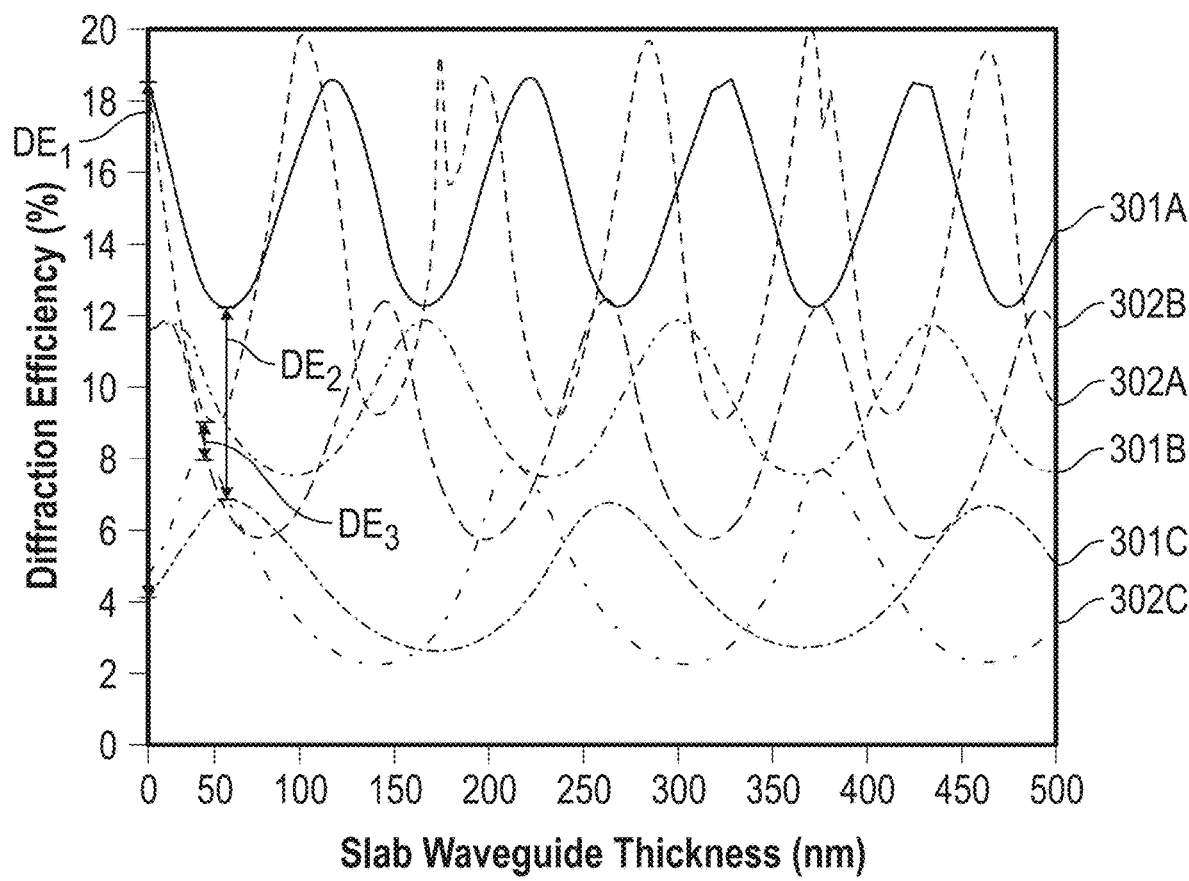
FIG. 3 is graph of simulated diffraction efficiency of three waveguides.

FIG. 3 is graph of simulated diffraction efficiency of three waveguides. The waveguide 100 simulated does not include the slab waveguide layer 210. The diffraction efficiency ratio is the ratio of the minimum diffraction efficiency of blue channel light to the maximum diffraction efficiency red channel light. The waveguide 100 described herein that is modeled has a diffraction efficiency DE$_1$ of 4.5:1.0 (18% minimum diffraction efficiency of blue channel light to 4% maximum diffraction efficiency red channel light). Wave 301A is the diffraction efficiency of blue channel light at a wavelength $\lambda_0$ of 450 nanometers (nm) for a first model of the waveguide 200. Wave 301B is the diffraction efficiency of green channel light at a wavelength $\lambda_0$ of 520 nm for the first model of the waveguide 200. Wave 301C is the diffraction efficiency of red channel light at a wavelength $\lambda_0$ of 620 nm for the first model of the waveguide 200. The first model of the waveguide 200 has a waveguide substrate 201 with a $n_{sub}$ of 2.0 and a slab waveguide layer 210 of amorphous TiOx with an $n_{swg}$ of 2.45 at 450 nm, 2.37 at 520 nm, and 2.31 at 620 nm. The first model of the waveguide 200 has a diffraction efficiency DE$_2$ of 1.8:1.0 at 50 nm. To improve the diffraction efficiency ratio, waveguide 200 is modeled a second time.

Wave 302A is the diffraction efficiency of blue channel light at a wavelength $\lambda_0$ of 450 nm for a second model of the waveguide 200. Wave 302B is the diffraction efficiency of green channel light at a wavelength 1% of 520 nm for a first model of the waveguide 200. Wave 302C is the diffraction efficiency of red channel light at a wavelength $\lambda_0$ of 620 nm for the third model of the waveguide 200. The second model of the waveguide 200 has a waveguide substrate 201 with an $n_{sub}$ of 2.0 and a slab waveguide layer 210 of crystalline TiOx with an $n_{swg}$ of 2.73 at 450 nm, 2.61 at 520 nm, and 2.53 at 620 nm. The average $n_{swg}$ is 2.62. The second of the waveguide 200 has a diffraction efficiency DE$_3$ of 1.1:1.0 at 35 nm. Thus, the second model of the waveguide 200 includes a $n_{sub}$ of 2.0, average $n_{swg}$ of 2.62, and slab depth $d_{swg}$ of 35 nm.

In some embodiments, the substrate RI $n_{sub}$ of the waveguide substrate at 620 nm is 1.8 to 2.10. In other embodiments, the substrate RI $n_{sub}$ of the waveguide substrate at 620 nm greater than 2.77. Table 1 shows optimal ranges of slab depth $d_{swg}$ based on a substrate RI $n_{sub}$ of 2.0 and a respective slab RI $n_{swg}$ at 620 nm.

TABLE 1

| Slab RI $n_{swg}$ at 620 nm | Optimal Range of Slab Depth $d_{swg}$ |
| --- | --- |
| 2.1 | 75 nm-110 nm |
| 2.2 | 55 nm-100 nm |
| 2.3 | 35 nm-85 nm |
| 2.4 | 30 nm-70 nm |
| 2.5 | 25 nm-60 nm |
| 2.6 | 15 nm-50 nm |

Figure 4A:
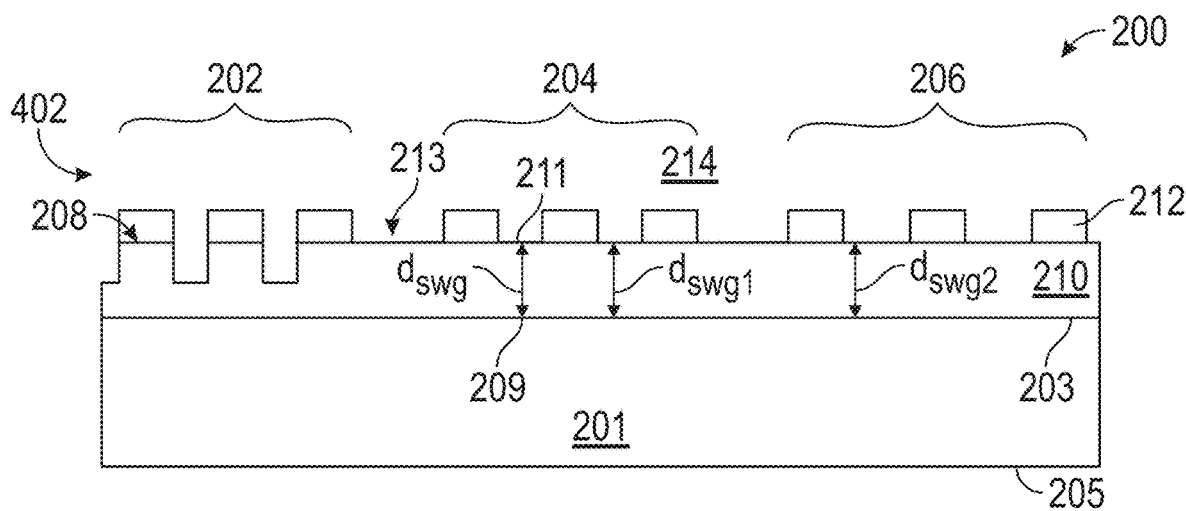
FIGS. 4A-4C are cross-sectional views of a waveguide according to different configurations.
Figure 4B:
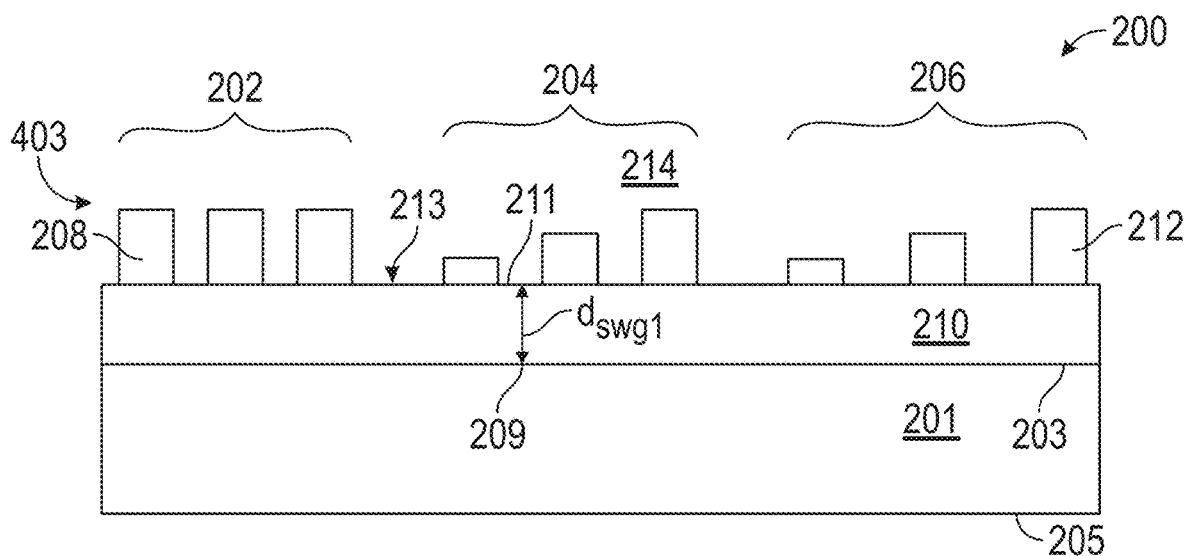
Figure 4C:
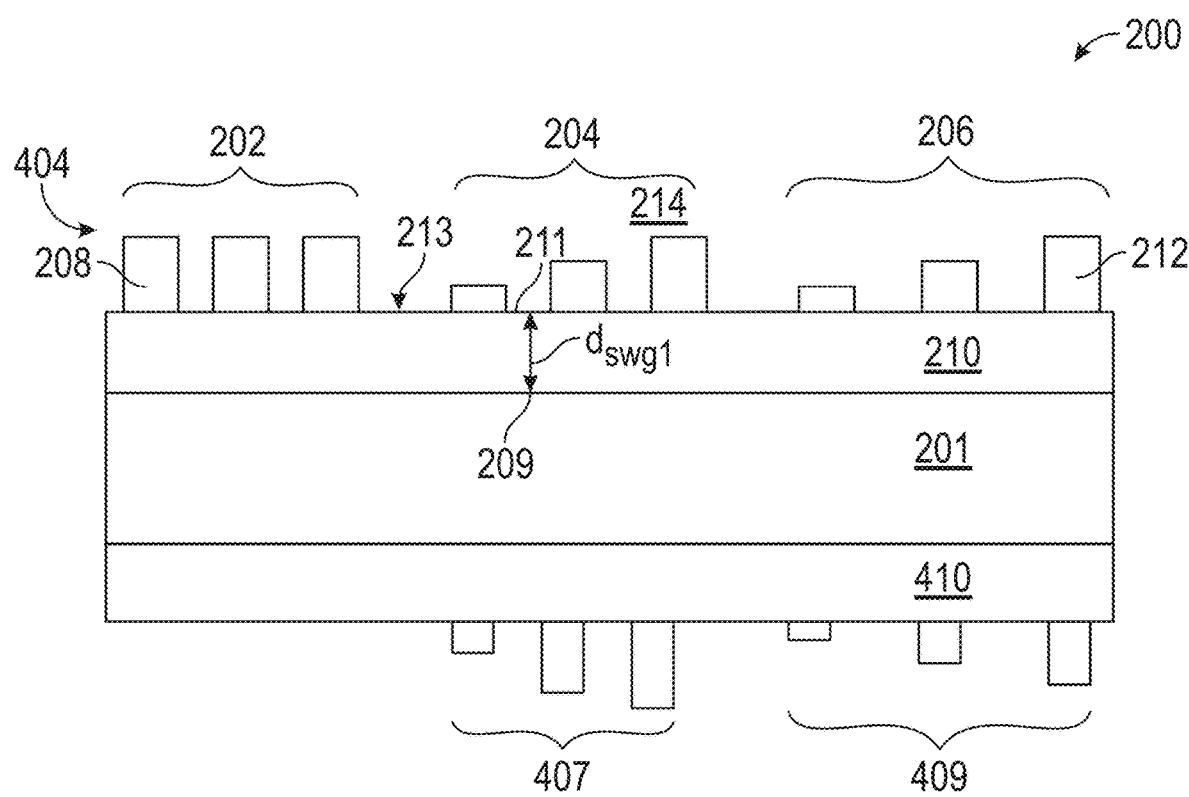

FIGS. 4A-4C are cross-sectional views of the waveguide 200 according to different configurations. In a second configuration 402 as shown in FIG. 4A, the grating structures 208 of the in-coupler 202 are disposed in the slab waveguide layer 210 and the grating structures 208 the first grating 204 and the second grating 206 are disposed over the slab waveguide layer 210. A grating material 212 of the grating structures 208 over the slab waveguide layer 210 has a grating RI $n_{grat}$. In some embodiments, the slab waveguide layer 210 and the grating material 212 are the same resulting in the same $n_{grat}$ and $n_{swg}$. In other embodiments, the slab waveguide layer 210 and the grating material 212 are different resulting in $n_{grat}$ and $n_{swg}$ that are different. The third configuration 403 as shown in FIG. 4B and the fourth configuration 404 as shown in FIG. 3C include the grating structures 208 are disposed over, and in some embodiments on, the slab waveguide layer 210. The fourth configuration 404 of the waveguide 200 include a second slab waveguide layer 410. The slab waveguide layer 210 and the second slab waveguide layer 410 are disposed on opposite sides of the waveguide substrate 201. The second slab waveguide layer 410 includes at least a third grating 407 disposed thereover. In some embodiments, a fourth grating 409 is disposed over the second slab waveguide layer 410.

Figure 5A:
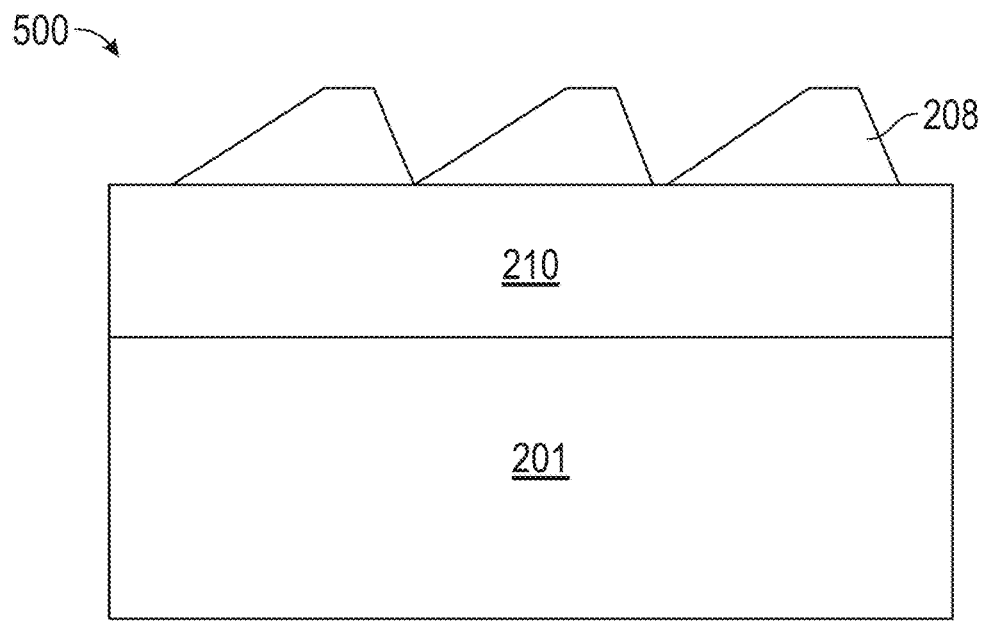
FIGS. 5A-5E are cross-sectional views of gratings according to embodiments.
Figure 5B:
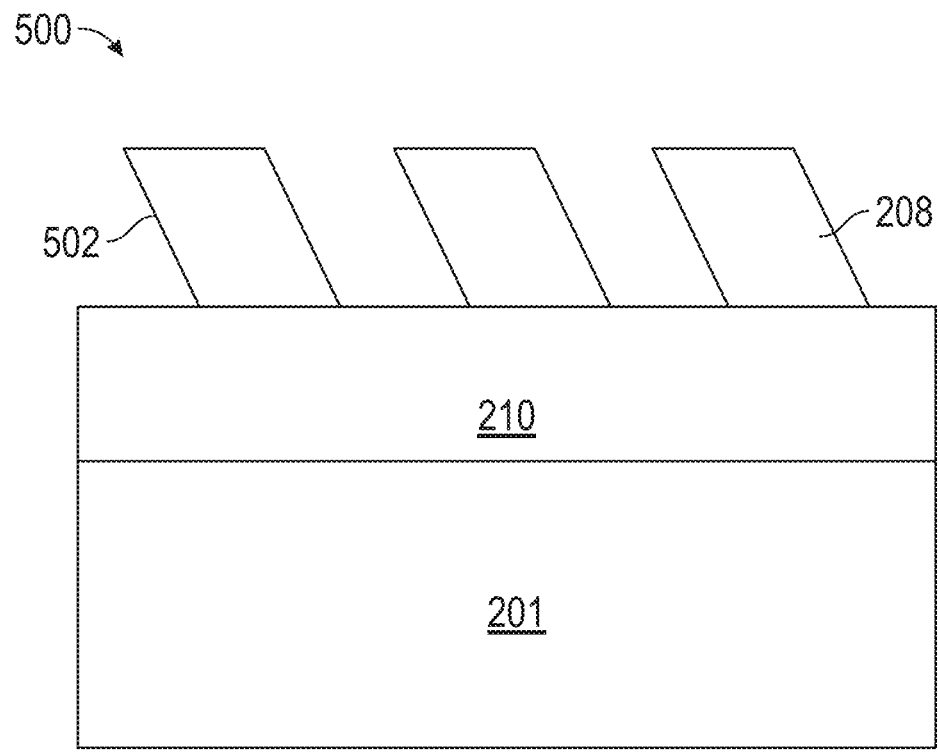
Figure 5C:
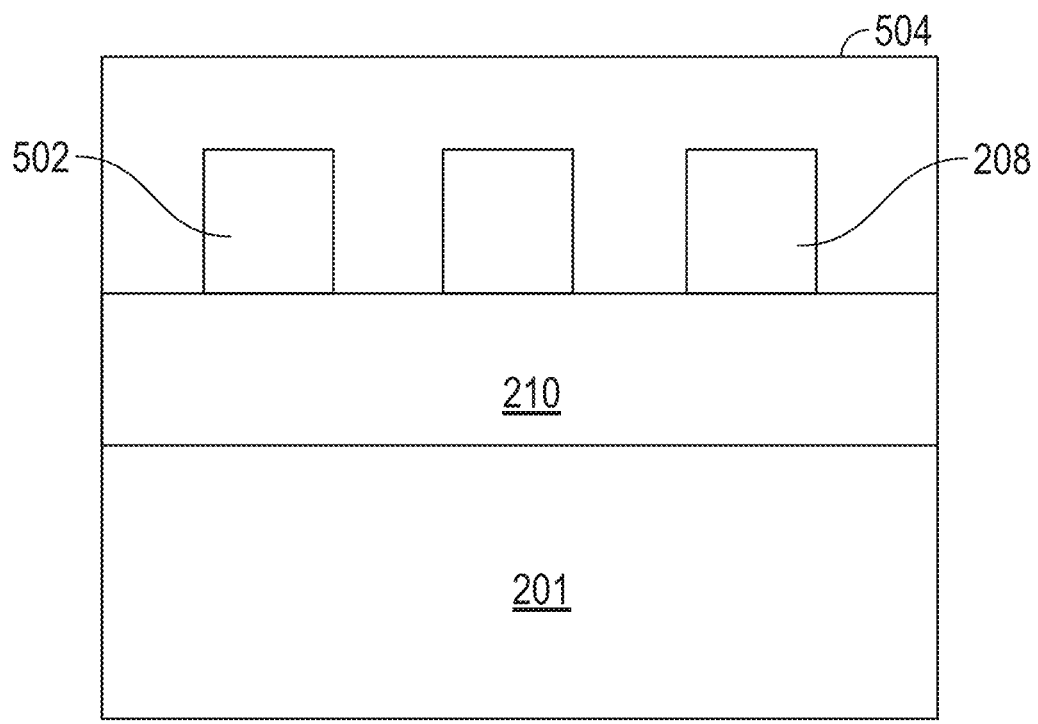
Figure 5D:
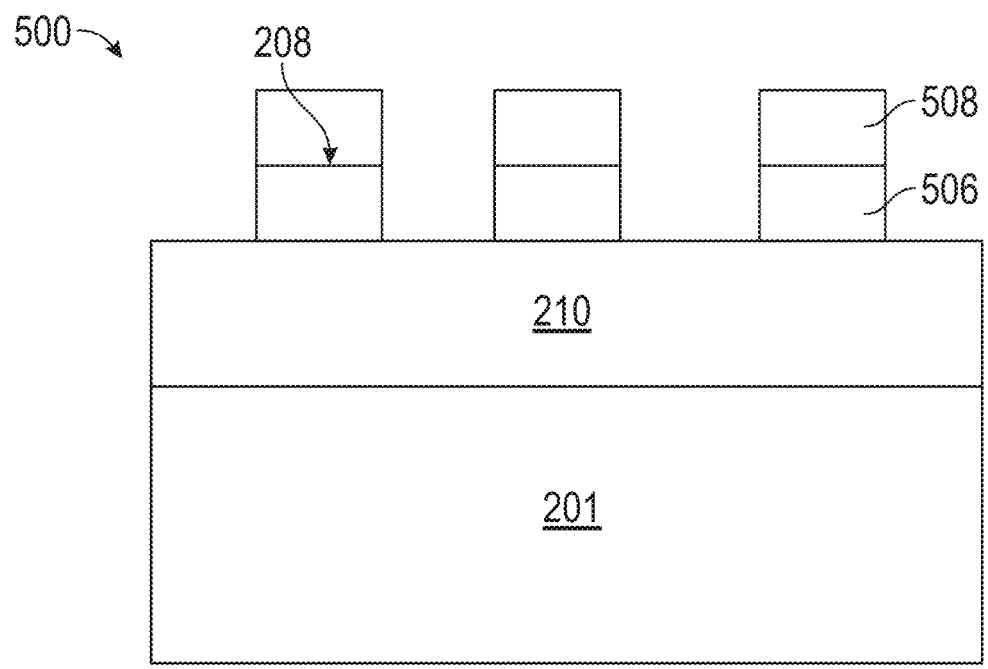
Figure 5E:
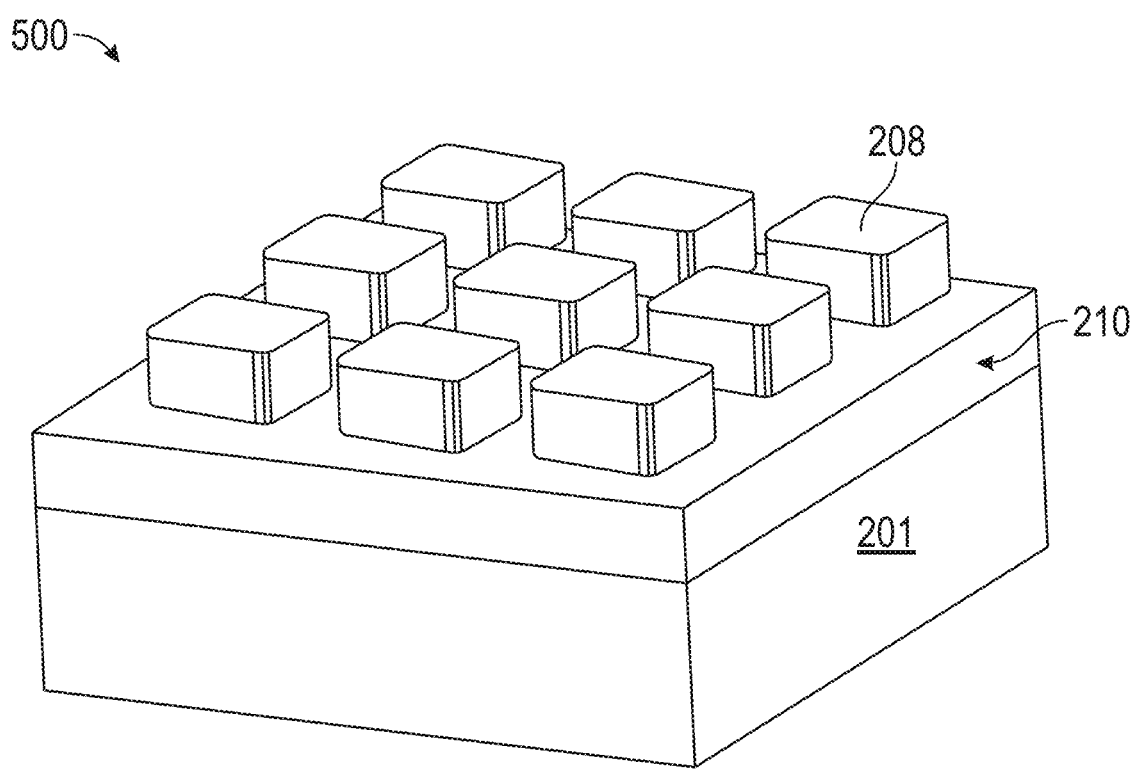

FIGS. 5A-5E are cross-sectional views of gratings 500. The gratings 500 may correspond to at least one of the in-coupler 202, the first grating 204, or the second grating 206 of the waveguide 200. As shown in FIG. 5A, the grating structures 208 are blazed grating structures. As shown in FIG. 5B, the grating structures 208 have sidewalls 502 parallel to each other and angled relative to the first surface 203 of the waveguide substrate 201. As shown in FIG. 5C, the grating structures 208 have sidewalls 502 parallel to each other and perpendicular to the first surface 203 of the waveguide substrate 201. The superstrate 214 is a coating 504. As shown in FIG. 5D, the grating structures 208 include a first layer 506 of a first material and a second layer 508 of a second material. As shown in FIG. 5E, the grating structures 208 the grating structures have two-dimensional periodicity.

While the foregoing is directed to examples of the present disclosure, other and further examples of the disclosure may be devised without departing from the basic scope thereof, and the scope thereof is determined by the claims that follow.

What is claimed is:

1. A waveguide, comprising:
a waveguide substrate, having a substrate refractive index (RI) $n_{sub}$;
a slab waveguide layer disposed over the waveguide substrate, the slab waveguide layer having a slab RI $n_{swg}$;
an incoupler grating defined by a first portion of a plurality of grating structures in the slab waveguide layer, the grating structures of the incoupler grating are disposed in the slab waveguide layer such that the incoupler grating has a depth from a lower surface to an upper surface of the slab waveguide layer between the grating structures of the incoupler grating;
a fold grating defined by a second portion of the plurality of grating structures and an outcoupler grating defined by a third portion of the plurality of grating structures in the slab waveguide layer, the second portion is separated from the third portion, the slab waveguide layer has a slab depth $d_{swg}$ from the lower surface to the upper surface of the slab waveguide layer between the grating structures of the fold grating and the outcoupler grating, the slab depth $d_{swg}$ is greater than the depth of the incoupler grating; and
a superstrate between and over the grating structures, the superstrate having a superstrate RI $n_{superstrate}$ and an interface with the slab waveguide layer, wherein the slab RI $n_{swg}$ is greater than the substrate RI $n_{sub}$ and the slab RI $n_{swg}$ is greater than the superstrate RI $n_{superstrate}$.

2. The waveguide of claim 1, wherein the slab waveguide layer is disposed on the waveguide substrate.

3. The waveguide of claim 1, further comprising a grating material disposed on the slab waveguide layer, wherein a material of the slab waveguide layer and the grating material are different.

4. The waveguide of claim 3, wherein the grating structures of the incoupler grating are disposed in the grating material and the slab waveguide layer.

5. The waveguide of claim 1, wherein waveguide substrate comprises glass, silicon (Si), silicon dioxide ($SiO_2$), germanium (Ge), silicon germanium (SiGe), indium phosphide (InP), gallium arsenide (GaAs), gallium nitride (GaN), fused silica, quartz, sapphire ($Al_2O_3$), silicon carbide (SiC), lithium niobate ($LiNbO_3$), indium tin oxide (ITO), or combinations thereof.

6. The waveguide of claim 1, wherein the slab waveguide layer comprises one or more of silicon oxycarbide (SiOC), titanium dioxide ($TiO_2$), silicon dioxide ($SiO_2$), vanadium (IV) oxide (VOx), aluminum oxide ($Al_2O_3$), aluminum-doped zinc oxide (AZO), indium tin oxide (ITO), tin dioxide ($SnO_2$), zinc oxide (ZnO), tantalum pentoxide ($Ta_2O_5$), silicon nitride ($Si_3N_4$), zirconium dioxide ($ZrO_2$), niobium oxide ($Nb_2O_5$), cadmium stannate ($Cd_2SnO_4$), titanium silicon oxide (TiSiOx) or silicon carbon-nitride (SiCN) containing materials.

7. The waveguide of claim 1, wherein the substrate RI $n_{sub}$ at 620 nm is 1.8 to 2.10.

8. The waveguide of claim 1, wherein the substrate RI $n_{sub}$ at 620 nm is greater than 2.77.

9. The waveguide of claim 1, wherein the slab RI $n_{swg}$ at 620 nm is 1.8 to 2.6.

10. The waveguide of claim 1, wherein the slab depth $d_{swg}$ is:
75 nm to 110 nm when the slab RI $n_{swg}$ at 620 nm is 2.1;
55 nm to 100 nm when the slab RI $n_{swg}$ at 620 nm is 2.2;
35 nm to 85 nm when the slab RI $n_{swg}$ at 620 nm is 2.3;
30 nm to 70 nm when the slab RI $n_{swg}$ at 620 nm is 2.4;
25 nm to 60 nm when the slab RI $n_{swg}$ at 620 nm is 2.5; and
15 nm to 50 nm when the slab RI $n_{swg}$ at 620 nm is 2.6.

11. The waveguide of claim 1, wherein the waveguide has a diffraction efficiency ratio of a diffraction efficiency of blue channel light to the diffraction efficiency of red channel light of 1.1:1.0.

12. The waveguide of claim 1, wherein the grating structures are blazed grating structures.

13. The waveguide of claim 1, wherein the grating structures have sidewalls parallel to each other and angled relative to the waveguide substrate.

14. The waveguide of claim 1, wherein the grating structures have two-dimensional periodicity.

15. The waveguide of claim 1, wherein the superstrate is a coating.

16. The waveguide of claim 1, wherein the waveguide has a resonance condition of $$2n_{swg}k_0\cos(\theta)d + \phi_{sub} + \phi_{grating} = 2\pi m$$

wherein, $k_0$ is the wavenumber of light $$\left(\frac{2\pi}{\lambda_0}\right),$$

d is the slab depth $d_{swg}$, $\theta$ is the angle of propagation of light in the slab waveguide layer, $\phi_{sub}$ is a phase accumulated upon reflection at the interface, and $\phi_{grating}$ is the phase accumulated upon reflection at a the interface.

17. The waveguide of claim 16, wherein a change in slab depth $d_{swg}$ between resonance peaks, $\Delta d$, is determined by solving $$\Delta d = \frac{\lambda_0}{2n_{swg}\cos(\theta)}$$

wherein $\lambda_0$ corresponds to a wavelength of a blue channel light, a green channel light, or a red channel light.

18. The waveguide of claim 1, wherein the slab depth $d_{swg}$ from the lower surface to the upper surface of the slab waveguide layer between the grating structures of the fold grating and the grating structures of the outcoupler grating is the same.

19. A waveguide, comprising:
a waveguide substrate, having a substrate refractive index (RI) $n_{sub}$;
a slab waveguide layer disposed over the waveguide substrate, the slab waveguide layer having a slab RI $n_{swg}$;
an incoupler grating defined by a first plurality of grating structures in the slab waveguide layer, the grating structures of the incoupler grating are disposed in the slab waveguide layer such that the incoupler grating has a depth from a lower surface to an upper surface of the slab waveguide layer between the grating structures of the incoupler grating;
an outcoupler grating defined by a second plurality of grating structures in the slab waveguide layer, the slab waveguide layer has a slab depth $d_{swg}$ from the lower surface to the upper surface of the slab waveguide layer between the grating structures of the outcoupler grating, the slab depth $d_{swg}$ is greater than the depth of the incoupler grating; and
a superstrate between and over the grating structures, the superstrate having a superstrate RI $n_{superstrate}$ and an interface with the slab waveguide layer, wherein the slab RI $n_{swg}$ is greater than the substrate RI $n_{sub}$, and the slab RI $n_{swg}$ is greater than the superstrate RI $n_{superstrate}$, and the slab depth $d_{swg}$ is:
75 nm to 110 nm when the slab RI $n_{swg}$ at 620 nm is 2.1;
55 nm to 100 nm when the slab RI $n_{swg}$ at 620 nm is 2.2;
35 nm to 85 nm when the slab RI $n_{swg}$ at 620 nm is 2.3;
30 nm to 70 nm when the slab RI $n_{swg}$ at 620 nm is 2.4;
25 nm to 60 nm when the slab RI $n_{swg}$ at 620 nm is 2.5; and
15 nm to 50 nm when the slab RI $n_{swg}$ at 620 nm is 2.6.

20. A waveguide, comprising:
a waveguide substrate, having a substrate refractive index (RI) $n_{sub}$;
a slab waveguide layer disposed over the waveguide substrate, the slab waveguide layer having a slab RI $n_{swg}$;
an incoupler grating defined by a first plurality of grating structures in the slab waveguide layer, the grating structures of the incoupler grating are disposed in the slab waveguide layer such that the incoupler grating has a depth from a lower surface to an upper surface of the slab waveguide layer between the grating structures of the incoupler grating;
an outcoupler grating defined by a second plurality of grating structures in the slab waveguide layer, the slab waveguide layer has a slab depth $d_{swg}$ from the lower surface to the upper surface of the slab waveguide layer between the grating structures of the outcoupler grating, the slab depth $d_{swg}$ is greater than the depth of the incoupler grating; and
a superstrate between and over the grating structures, the superstrate having a superstrate RI $n_{superstrate}$ and an interface with the slab waveguide layer, wherein the slab RI $n_{swg}$ is greater than the substrate RI $n_{sub}$, and the slab RI $n_{swg}$ is greater than the superstrate RI $n_{superstrate}$.

* * * * *